३,२७८,५५४
ESTERS CONTAINING MORE THAN ONE OXETANE GROUP
Bernard Peter Stark, Stapleford, Cambridge, England, assignor to Ciba Limited, Basel, Switzerland, a company of Switzerland
No Drawing. Filed Oct. 8, 1962, Ser. No. 229,189
Claims priority, application Great Britain, Oct. 11, 1961, 36,529/61
8 Claims. (Cl. 260—333)

This invention relates to esters containing two or more oxetane groups, to processes for the production of such esters, and to the uses of such esters.

According to the present invention there are provided, as new chemical compounds, esters containing at least two oxetane rings (otherwise known as oxacyclobutane or trimethylene oxide rings), and having the general Formula I:

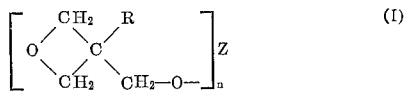  (I)

wherein $n$ stands for a small integer of value greater than one, preferably being two, three or four, Z stands for the residue of an organic compound, originally having $n$ carboxyl groups, that remains after removal of hydroxyl groups from such carboxyl groups, and R is an alkyl group, preferably a methyl or ethyl group.

The oxetane esters of general Formula I are transparent compounds which are liquid at room temperature or readily fusible and which may be hardened, for example by treatment with a dicarboxylic acid anhydride, to yield clear, light-coloured, hardened (i.e. insoluble and infusible) products of very valuable technical properties.

According to a further feature of the invention, the esters of general Formula I may be readily obtained by the reaction of $n$ moles of a hydroxyoxetane of general formula II:

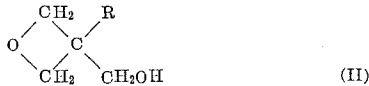  (II)

wherein R has the meaning assigned to it above, with one mole of an ester of Formula III:

$$[R'O\!\!-\!\!]_n Z \qquad \text{III}$$

in which Z has the meaning assigned assigned to it above, and R' is a hydrocarbon residue, preferably an alkyl group possessing between one and four carbon atoms. This reaction, which may be represented by the equation:

may be brought about by heating mixtures of the reactants of Formulae II and III, preferably in the presence of a transesterification catalyst which is not a strong acid. Such transesterification catalysts include, for example: tetraalkyl titanates such as tetrabutyl titanate, zinc acetate, cadmium acetate, dibutyltin oxide, and alkali metals and their hydroxides and alkoxides, quaternary ammonium hydroxides and quaternary ammonium hydroxide-containing ion-exchange resins such as those sold under the trade names Amberlite IRA–400 and IRA–401, Dowex, and De-Acidite FF. The transesterification reactants may be conducted in the absence of a solvent or in the presence of a suitable inert solvent, e.g. dioxan, toluene, or chlorine-containing aromatic hydrocarbons, and are preferably conducted at a temperature within the range 20–200° C. If desired, the transesterification reactions may be carried out under reduced pressure, so that the alcohol R'OH produced according to the equation above is removed by distillation from the system. Alternatively, an excess of the hydroxyoxetane of Formula II may be added to the reaction mixture so as to displace the equilibrium in favour of the desired bis- or poly-oxetane of Formula I. Subsequently, if desired, the transesterification catalyst may be removed or destroyed, and if considered necessary the excess of hydroxyoxetane may be removed, for example by distillation.

If the transesterification reaction, under practical conditions, does not proceed absolutely to completion, there may be left present in the final reaction product compounds having free hydroxyl groupings and/or compounds conforming to the general Formula IV:

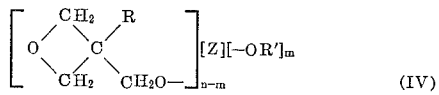  (IV)

wherein R, R' and Z and $n$ have the meanings previously assigned to them, and $m$ is an integer of value less than $n$.

It has been established that the presence of such by-products, as a rule, does not deleteriously affect, and may even favourably influence, the technical properties of the hardened polyoxetanes. Accordingly, it is generally unnecessary to isolate the pure bis- or poly-oxetane from the reaction mixture in which it is formed.

The preferred esters of Formula III are methyl, ethyl, propyl, or butyl esters of di-, tri- and tetra-carboxylic acids, such as oxalic, malonic, succinic, glutaric, adipic, sebacic, phthalic, isophthalic, tetraphthalic, maleic, itaconic, citraconic, citric, tricarballylic, tetrahydrophthalic, methylendomethylene - tetrahydrophthalic, hexahydrophthalic, and pyromellitic acids, and of dimerised or trimerised unsaturated long-chain fatty acids. Mixtures of such esters may be used in the transesterification reactions described above.

The esters of general Formula I may be cross-linked and hardened with those bis- or poly-functional compounds which are in general capable of reacting with compounds containing oxetane rings; alternatively or additionally, the esters of general Formula I may be polymerised by Friedel-Crafts catalysts such as $AlCl_3$ $SnCl_4$ $SbCl_5$, $ZnCl_2$ and $BF_3$ and their complexes with organic compounds. The preferred hardeners are polybasic acids and their anhydrides, e.g. phthalic acid, methylenedomethylene-tetrahydrophthalic anhydrides, dodecenylsuccinic anhydride, hexahydrophthalic anhydride, hexachloroendomethylene-tetrahydrophthalic anhydride or endomethylenetetrahydrophthalic anhydride, maleic anhydride, succinic anhydride, adipic acid, phthalic anhydride, or mixtures of such acids or anhydrides. In some cases accelerators for the hardening action may also be present; suitable such accelerators are, for example, tertiary amines and/or strong acids such as toluene-p-sulphonic acid.

According to a further feature of the present invention, therefore, there are provided hardenable compositions which comprise one or more esters of general Formula I together with one or more hardening agents therefor, preferably di- or poly-carboxylic acid anhydrides.

According to still other features of the invention, such hardenable mixtures may also contain a proportion of unsymmetrical esters of Formula IV, and may also or alternatively contain hydroxy-compounds such as hydroxy-oxethanes of Formula II; in addition, other resins which are capable of reacting with the aforesaid hardeners or polymerisation catalysts may also be present in the compositions of this invention. These other resins include, in particular, other bis-oxetanes such as 2,6-dioxaspiro(3,3)heptane and reaction products of alkali metal salts of bisphenols with 3-halomethyl-3-alkyl-1-oxacyclobutanes, and also bis- and poly-epoxides such as di- or polyglycidyl ethers of poly- or di-alcohols of di- or polyphenols such as bis(4-hydroxypenyl)-dimethylmethane, polyglycidyl esters of polycarboxylic acids, or aminopolyepoxides such as are, for example, obtained by dehydrohalogenation of the reaction products from epihalohydrins and primary or secondary amines and alicyclic compounds which bear epoxide groupings.

The compounds of this invention may also contain fillers, plasticizers or colouring agents, for example asphalt, bitumen, glass fibres, mica, quartz powder, cellulose, kaolin, finely-divided silica such as that available under the trade name "Aerosil," kieselguhr or metal powder.

The aforesaid compositions may be used in the filled or unfilled state, e.g. in the form of solutions or emulsions, as textile auxiliaries, laminating resins, varnishes, lacquers, dipping resins, casting resins, and encapsulating, coating, filling and packing materials, moulding compositions, adhesives and the like, as well as for the preparation of such materials.

The following examples will serve to illustrate the invention. In these examples percentages are by weight and temperatures are in degrees centigrade.

*Example I*

Di-n-propyl oxalate (87 gm., 0.5 mole) was added to a solution of sodium hydroxide (1.3 gm.) in 3-ethyl-3-hydroxy-methyl-1-oxacyclobutane (127.6 gm., 1.1 mole). The mixture was heated at 90° C., under such a reduced pressure that propanol was removed by distillation. The mixture was finally heated at 100° C. at a pressure of 1 mm. Hg; it was then cooled, and poured into a mixture of water (500 ml.) and benzene (500 ml.). The layers were separated, and the organic layer was washed with water (2×250 ml.), and was then dried over anhydrous sodium sulphate. The dried solution was filtered, and the solvent was evaporated in vacuo from the filtrate to yield a residue of the crude desired oxetane ester as an almost colourless liquid. The infra-red spectrum of this material showed only a weak band at ca. 3400 cm.$^{-1}$, but a strong band at ca. 980 cm.$^{-1}$; this was indicative of the presence of oxetane groupings in the molecule, and of small amounts only of hydroxylic impurities.

*Example II*

A second oxetane-ester was prepared by reaction of diethyl succinate (174.2 gm., 1 mole) with 3-ethyl-3-hydroxymethyl-1-oxacyclobutane (255.2 gm., 2.2 moles) in the presence of sodium hydroxide (2.5 gm.) as transesterification catalyst. The conditions used during the reaction, and for work-up of the reaction mixture were essentially those described in Example I above. Ethanol distilled off during the reaction, and on final removal of volatile materials under high vacuum a colourless, very mobile liquid (298.6 gm.) was obtained. The infra-red spectrum of this material showed strong peaks at ca. 1720 cm.$^{-1}$ and ca. 980 cm.$^{-1}$ (indicating the presence of carboxylic ester and oxetane groupings); the presence of only a very small peak at ca. 3400 cm.$^{-1}$ indicated the virtual absence of hydroxylic compounds.

*Example III*

Another oxetane-ester was prepared by reaction of dimethyl adipate (348 gm., 2 moles) with 3-ethyl-3-hydroxymethyl-1-oxacyclobutane (510.4 gm., 4.4 moles) in the presence of sodium hydroxide (5 gm.) as catalyst; the conditions used were essentially the same as those described in Example I above. Methanol distilled off during the reaction, and on final removal of volatile materials, a colourless very mobile liquid (343.6 gm.) was obtained as residual product. The infra-red spectrum of this material showed strong bands at ca. 1720 cm.$^{-1}$ and ca. 980 cm.$^{-1}$, but a very weak band only at ca. 3400 cm.$^{-1}$; this indicated the presence of ester and oxetane groupings in the product, but that only small amounts of hydroxylic compounds were present.

*Example IV*

Diethyl adipate (20.2 gm., 0.1 mole) and 3-ethyl-3-hydroxymethyl-1-oxacyclobutane (23.2 gm., 0.2 mole) were reacted together in the presence of tetrabutyl titanate (1 gm.) as transesterification catalyst; the reaction was carried out at a temperature of 120° C. under such a reduced pressure that ethanol was removed from the reaction mixture by distillation. The residue obtained was a viscous pale yellow oil whose infra-red spectrum was very similar to that of the oxetane-ester described in Example III above, and which in particular showed only weak absorption at ca. 3400 cm.$^{-1}$ (hydroxyl impurity), but strong absorption at 980 cm.$^{-1}$ (oxetane).

8.1 gm. of this material were mixed with 5 gm. of maleic anhydride, and the mixture was hardened by heating for 6 hours at 140° C. A non-brittle, brown, insoluble and infusible hardened resin was obtained.

*Example V*

3-ethyl-3-hydroxymethyl-1-oxacyclobutane (23.2 gm., 0.2 mole) and diethyl adipate (20.2 gm., 0.1 mole) were mixed with zinc acetate (1 gm.), and the mixture was heated for 18 hours at 120° C., the pressure being gradually reduced during that time to a final value of 15 mm. Hg. The distillate was collected in a trap cooled with a slurry of solid carbon dioxide in 2-methoxy-ethanol; examination of its infra-red spectrum showed that this distillate consisted of almost pure ethanol. The residue (34.8 gm.), left in the flask, a pale yellow oil, had an infra-red spectrum which was almost identical with the spectra of the products described in Examples III and IV above, and showed, in particular, a small peak only at ca. 3400 cm.$^{-1}$ (hydroxyl), but a strong peak at ca. 980 cm.$^{-1}$ (oxetane).

This material (5 gm.) was mixed with 5 gm. of a polyglycidyl ether, prepared in a known way by the reaction of epichlorohydrin with bis(4-hydroxyphenyl)dimethylmethane under alkaline conditions, and having an epoxy content of 5.2 epoxy equiv. per kgm. This mixture was stirred at 140° C. while phthalic anhydride (5 gm.) was dissolved in it; the resulting solution was cast into an aluminium mould, and was heated at 120° C. for 2 hours and then at 180° C. for 18 hours; at the end of this time, a pale yellow hard, infusible product was obtained.

*Example VI*

Diethyl isophthalate (22.2 gm., 0.1 mole), 3-ethyl-3-hydroxymethyl-1-oxacyclobutane (23.2 gm., 0.2 mole) and tetrabutyl titanate (1 gm.) were mixed and heated as described in Example IV above. The desired oxetane-ester was obtained as a residual viscous pale yellow oil (34.3 gm.); the infra-red spectrum of this material showed a very weak hydroxyl band at ca. 3400 cm.$^{-1}$ but a strong oxetane band at ca. 980 cm.$^{-1}$.

Maleic anhydride (5 gm.) was dissolved in this material (8.6 gm.), and the solution was heated at 140° C. for 6 hours. A yellow infusible hardened resin was obtained.

*Example VII*

Di-n-propyl isophthalate (700 gm.) was reacted with 3-ethyl-3-hydroxymethyl-1-oxacyclobutane (714 gm.) in the presence of sodium hydroxide (7 gm.); the conditions used for reaction, and for isolation of the product, were essentially those described in Example I above. The product was obtained as a very pale yellow liquid (877 gm.), whose infra-red spectrum was essentially identical with that of the oxetane-ester described in Example VI above (strong oxetane absorption at ca. 980 cm.$^{-1}$, weak hydroxyl absorption at ca. 3400 cm.$^{-1}$).

*Example VIII*

Phthalic anhydride (57.75 gm.) was dissolved with stirring and heating in a mixture of the oxetane ester described in Example VII (35.0 gm.) and 3-ethyl-3-hydroxymethyl-1-oxacyclobutane (15.0 gm.), and the resulting solution was poured into an aluminium mould, and was heated for 6 hours at 140° C. and then for 24 hours at 180° C. At the end of this time, a very pale yellow hardened casting was obtained, having the following mechanical values: Martens (DIN) value 74° C.; flexural strength 8.8 kg./mm.$^2$; impact strength 7.1 cm. kg./cm.$^2$.

*Example IX*

A mixture of the oxetane-ester described in Example VII (35.0 gm.), 3-ethyl-3-hydroxymethyl-1-oxacyclobutane (15.0 gm.), phthalic anhydride (57.75 gm.) and stannous octoate (5.0 gm.) was heated for 5 hours at 140° C. and then for 24 hours at 180° C. A yellow hardened casting was obtained, having the following mechanical properties: Martens (DIN) value: 61° C.; flexural strength 9.2 kg./mm.$^2$; impact strength 7.2 cm. kg./cm.$^2$.

*Example X*

A mixture of the oxetane-ester described in Example VI above (10 gm.), phthalic anhydride (8.15 gm.) and benzyldimethylamine (0.1 gm.) was heated for 24 hours at 140° C. and then for 3 hours at 180° C.; a strong clear yellow casting of Martens value 49° C. was obtained.

*Example XI*

A mixture of the oxetane-ester described in Example VI (10 gm.), phthalic anhydride (8.15 gm.) and p-toluenesulphonic acid (0.1 gm.) was heated for 24 hours at 140° C. and then for 3 hours at 180° C.; a pale yellow opalescent casting of Martens value 75° C. was obtained.

*Example XII*

A mixture of thte oxetane-ester described in Example VII (18.1 gm.), phthalic anhydride (14.8 gm.), benzyldimethylamine (0.2 gm.) and p-toluenesulphonic acid (0.2 gm.) was heated for 18½ hours at 140° C. and then for 24 hours at 180° C.; a pale yellow hardened casting was obtained, having a Martens value of 85° C.

*Example XIII*

A mixture of the oxetane-ester described in Example VII (9.05 gm.), phthalic anhydride (7.4 gm.) and ethylene glycol (0.5 gm.) was heated for 20 hours at 140° C. and then for 24 hours at 180° C. A colourless casting having a Martens value of 88° C. resulted.

*Example XIV* p-Toluenesulphonic acid (0.5 gm.) was added to the mixture described in Example VIII, and the mixture was hardened under the conditions described in that example; a pale yellow-brown casting having a Martens value of 81° C. was obtained.

*Example XV*

A mixture of the oxetane-ester described in Example VII, (8.05 gm.), 3-ethyl-3-hydroxymethyl-1-oxacyclobutane (1.0 gm.), phthalic anhydride (7.4 gm.) and p-toluenesulphonic acid (0.5 gm.) was stirred and heated until it became homogeneous, and was then heated for 20 hours at 140° C. and then for 24 hours at 180° C. A very pale brown hardened casting having a Martens value of 100° C. was obtained.

*Example XVI*

A mixture of the oxetane-ester described in Example VII (9.0 gm.), 3-ethyl-3-hydroxymethyl-1-oxacyclobutane (1.0 gm.), phthalic anhydride (9.25 gm.) and zinc acetate (0.5 gm.) was heated for 16 hours at 140° C. and then for 24 hours at 180° C. A clear, very faint yellow hardened casting, having a Martens value of 103° C., resulted.

*Example XVII*

Diethyl phthalate (22.2 gm., 0.1 mole), tetrabutyl titanate (1 gm.) and 3-ethyl-3-hydroxymethyl-1-oxacyclobutane (23.2 gm., 0.2 mole) were mixed and heated at 150° C. for 18 hours, the pressure being reduced gradually to 15 mm. Hg. The product was obtained as an almost colourless liquid, a small amount of flocculent material also being present; the yield of undistilled material was 36.8 gm. Its infra-red spectrum has a weak band at 3400 cm.$^{-1}$ (hydroxylic impurity) but a strong oxetane band at ca. 980 cm.$^{-1}$.

Hexachloroendomethylenetetrahydrophthalic anhydride (11 gm.) was dissolved in this material (5 gm.). After 10 minutes at 140° C. a clear colourless hard solid was obtained.

*Example XVIII*

Diethyl phthalate (222.25 gm., 1 mole) 3-ethyl-3-hydroxymethyl-1-oxacyclobutane (255.2 gm., 2.2 mole) and sodium hydroxide (2.5 gm.) were reacted together, essentially as described in Example I. Removal of volatiles from the washed reaction mixture gave 281.3 gm. of an almost colourless liquid, whose infra-red spectrum showed a strong band at ca. 980 cm.$^{-1}$ (oxetane groupings), but almost no peak at 3400 cm.$^{-1}$ (i.e. hydroxylic compounds were absent). The spectrum of this material was almost identical with that of the oxetane-ester described in Example XVII. On distillation of the ester in vacuo, almost all distilled at 205–210° C./0.2 mm. Hg (mainly at 208° C./0.2 mm. Hg). Elementary analysis of the distillate gave the following values:

Calc. for $C_{20}H_{26}O_6$: C, 66.27; H, 7.23; O, 26.50%. Found: C, 66.57; H, 7.48; O, 26.10%.

*Example XIX*

A mixture of the oxetane-ester described in Example XVIII (35 gm.), 3-ethyl-3-hydroxymethyl-1-oxacyclobutane (15.0 gm.), phthalic anhydride (58.1 gm.) and stannous octoate (5.0 gm.) was heated for 5 hours at 140° C. and then for 24 hours at 180°. A yellow hardened casting having the following mechanical properties was obtained: Martens (DIN) value 48° C., flexural strength, 8.6 kg./mm.$^2$, impact strength, 7.8 cm.kg./cm.$^2$.

*Example XX*

Diethyl isophthalate (22.2 gm., 0.1 mole), 3-methyl-3-hydroxymethyl-1-oxacyclobutane (20.5 gm., 0.2 mole) and tetrabutyl titanate (1 gm.) were reacted together essentially as described in Example VI. The product (33 gm.) was a pale yellow oil, whose infra-red spectrum showed a strong oxetane band at ca. 980 cm.$^{-1}$, but only weak hydroxyl absorption at ca. 3400 cm.$^{-1}$.

*Example XXI*

Tetra-n-propyl pyromellitate (21.1 gm., 0.05 mole), 3-ethyl-3-hydroxymethyl-1-oxacyclobutane (23.2 gm., 0.2 mole) and tetrabutyl titanate (1 gm.) were mixed and heated at 150° C. for 4 hours, the pressure being gradually reduced during that time to 14 mm. Hg; propan-1-ol was collected as distillate. The residual grey-brown viscous oil (33.6 gm.) was found to be the crude polyoxetane-ester, since its infra-red spectrum had a weak band at ca. 3400 cm.$^{-1}$ but a strong oxetane band at ca. 980 cm.$^{-1}$.

Maleic anhydride (3.9 gm.) was dissolved in this product (6.5 gm.), and the mixture was heated at 140° C. The mixture gelled in ca. 40 min., and after 18 hours a hard infusible resin was obtained, having a Martens value of 126° C.

*Example XXII*

Di-n-propyl $\Delta^4$-tetrahydrophthalate (50.8 gm., 0.2 mole) was reacted with 3-ethyl-3-hydroxymethyl-1-oxacyclobutane (51.0 gm., 0.44 mole) in the presence of sodium hydroxide (0.5 gm.), under conditions essentially the same as those described in Example I above. The product (56.0 gm.) was a yellow viscous oil, whose infra-red spectrum showed a strong oxetane band at ca. 980 cm.$^{-1}$, but only weak hydroxyl absorption at ca. 3400 cm.$^{-1}$.

Phthalic anhydride (6.4 gm.) was dissolved in this product (10 gm.) with warming. The mixture, when heated for 24 hours at 140° C., yielded a hard pale yellow insoluble and infusible resin.

What is claimed is:

1. The compound of the formula

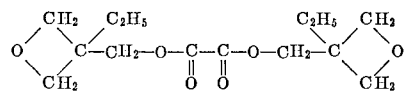

2. The compound of the formula

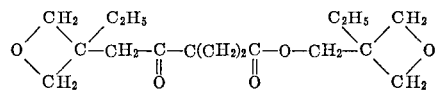

3. The compound of the formula

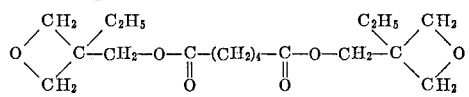

4. The compound of the formula

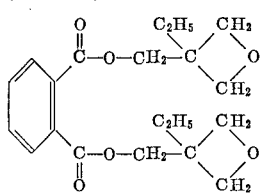

5. The compound of the formula

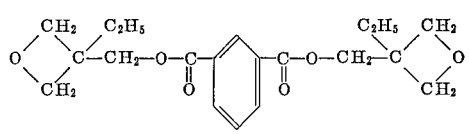

6. The compound of the formula

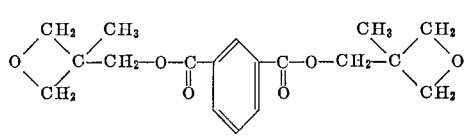

7. The compound of the formula

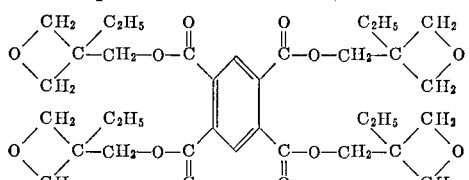

8. The compound of the formula

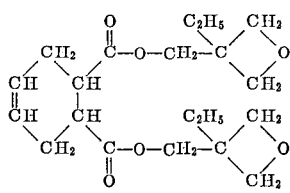

References Cited by the Examiner

UNITED STATES PATENTS

| | | | |
|---|---|---|---|
| 2,856,370 | 10/1958 | Muetterties | 260—2 |
| 2,886,472 | 5/1959 | Condo et al. | 260—348 |
| 2,910,483 | 10/1959 | Schnell et al. | 260—333 |
| 2,935,492 | 5/1960 | Newey et al. | 260—348 |
| 3,006,926 | 10/1961 | Case et al. | 260—333 |
| 3,027,352 | 3/1962 | Walling et al. | 260—2 |
| 3,093,660 | 6/1963 | Aftandilian | 260—348 X |
| 3,105,838 | 10/1963 | Luskin | 260—333 |

FOREIGN PATENTS 837,980  6/1960  Great Britain.

OTHER REFERENCES

Bergmann: The Chemistry of Acetylene and Related Compounds, p. 80 (1948).

Bodenbenner et al.: German application 1,021,858, printed Jan. 2, 1958 (KL.12q 24) 2 pages spec.

Chabrier et al.: Chem. Abstr., vol. 56, (1962) pp. 15451–2.

Richter's Organic Chemistry, vol. IV (1947) pp. 3–5, 12 and 13.

Wheland: Advanced Organic Chemistry, 2d. Ed., p. 373 (1949).

WALTER A. MODANCE, *Primary Examiner.*

NICHOLAS S. RIZZO, *Examiner.*

D. M. KERR, N. S. MILESTONE, *Assistant Examiners.*